US011022867B2

(12) United States Patent
Liu et al.

(10) Patent No.: US 11,022,867 B2
(45) Date of Patent: Jun. 1, 2021

(54) ILLUMINATION SYSTEM HAVING WAVELENGTH CONVERSION DEVICE AND PROJECTION DEVICE HAVING THE SAME

(71) Applicant: Coretronic Corporation, Hsin-Chu (TW)

(72) Inventors: Hung-Wei Liu, Hsin-Chu (TW); Chien-Chung Liao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 17 days.

(21) Appl. No.: 16/504,357

(22) Filed: Jul. 8, 2019

(65) Prior Publication Data
US 2020/0019049 A1  Jan. 16, 2020

(30) Foreign Application Priority Data
Jul. 10, 2018  (CN) .......................... 201810750147.0

(51) Int. Cl.
*G03B 21/20* (2006.01)

(52) U.S. Cl.
CPC ........... *G03B 21/20* (2013.01); *G03B 21/204* (2013.01); *G03B 21/2066* (2013.01)

(58) Field of Classification Search
CPC .. G03B 21/20; G03B 21/204; G03B 21/2066; G02B 26/008
See application file for complete search history.

(56) References Cited

U.S. PATENT DOCUMENTS

| 5,580,142 A | 12/1996 | Kurematsu et al. |
| 8,469,520 B2 | 6/2013 | Maeda |
(Continued)

FOREIGN PATENT DOCUMENTS

| CN | 101937127 | 1/2011 |
| CN | 101937161 | 1/2011 |
(Continued)

OTHER PUBLICATIONS

"Search Report of European Counterpart Application," dated Nov. 29, 2019, p. 1-p. 9.
(Continued)

*Primary Examiner* — Michelle M Iacoletti
*Assistant Examiner* — Magda Cruz
(74) *Attorney, Agent, or Firm* — JCIPRNET

(57) ABSTRACT

Provided is an illumination system including an excitation light source, a first light splitting element, a first light reflecting element, a wavelength conversion device, and a light filtering device. The excitation light source provides an excitation beam including a first sub-beam and a second sub-beam. The first light splitting element includes a first zone and a second zone. The wavelength conversion device includes an optical zone and a wavelength conversion zone. In a first time period, the first sub-beam is transmitted to the optical zone via the first zone, and the second sub-beam is transmitted to the light filtering device via the first light splitting element and the first light reflecting element. In a second time period, the excitation beam is transmitted to the wavelength conversion zone to be converted into a first conversion beam. Therefore, the structure can be simplified and the size can be reduced.

24 Claims, 12 Drawing Sheets

(56) References Cited

U.S. PATENT DOCUMENTS

| | | | |
|---|---|---|---|
| 8,911,092 B2 | 12/2014 | Fujita et al. | |
| 9,151,471 B2 | 10/2015 | Ogura | |
| 9,229,301 B2 | 1/2016 | Huang | |
| 9,348,204 B2 | 5/2016 | Chiu et al. | |
| 9,411,218 B2 | 8/2016 | Hsieh et al. | |
| 9,645,480 B2 | 5/2017 | Liao et al. | |
| 9,897,907 B2 | 2/2018 | Hsieh et al. | |
| 2005/0057145 A1 | 3/2005 | Shieh et al. | |
| 2010/0245776 A1 | 9/2010 | Yamamoto | |
| 2010/0328554 A1 | 12/2010 | Shibasaki | |
| 2010/0328626 A1 | 12/2010 | Miyazaki | |
| 2010/0328632 A1 | 12/2010 | Kurosaki et al. | |
| 2011/0043764 A1 | 2/2011 | Narikawa | |
| 2011/0205502 A1 | 8/2011 | Kato et al. | |
| 2011/0310353 A1 | 12/2011 | Maeda | |
| 2012/0062857 A1 | 3/2012 | Saitou et al. | |
| 2012/0075591 A1 | 3/2012 | Ogura et al. | |
| 2012/0242912 A1 | 9/2012 | Kitano | |
| 2013/0021582 A1 | 1/2013 | Fujita et al. | |
| 2013/0083509 A1 | 4/2013 | Ko | |
| 2013/0100417 A1 | 4/2013 | Yang et al. | |
| 2013/0100420 A1 | 4/2013 | Ferri et al. | |
| 2013/0250253 A1 | 9/2013 | Ogura | |
| 2013/0278902 A1* | 10/2013 | Chen | G03B 21/2066 353/31 |
| 2013/0314671 A1 | 11/2013 | Tseng | |
| 2013/0322056 A1 | 12/2013 | Konuma et al. | |
| 2014/0071407 A1 | 3/2014 | Takahashi et al. | |
| 2014/0211169 A1 | 7/2014 | Kitano et al. | |
| 2014/0285774 A1 | 9/2014 | Tajiri | |
| 2014/0362349 A1 | 12/2014 | Chiu et al. | |
| 2015/0023012 A1 | 1/2015 | Yang et al. | |
| 2015/0153636 A1 | 6/2015 | Hartwig | |
| 2015/0167907 A1 | 6/2015 | Hoehmann | |
| 2015/0177599 A1 | 6/2015 | Huang | |
| 2015/0253653 A1 | 9/2015 | Fujita et al. | |
| 2015/0316775 A1 | 11/2015 | Hsieh et al. | |
| 2015/0362830 A1 | 12/2015 | Liao et al. | |
| 2017/0192347 A1 | 7/2017 | Huang et al. | |
| 2018/0173087 A1 | 6/2018 | Hsieh et al. | |
| 2018/0224732 A1* | 8/2018 | Tian | G02B 27/1006 |
| 2018/0239233 A1* | 8/2018 | Kado | G03B 21/14 |
| 2018/0284586 A1 | 10/2018 | Yang et al. | |
| 2020/0124955 A1* | 4/2020 | Hu | G03B 21/204 |

FOREIGN PATENT DOCUMENTS

| | | |
|---|---|---|
| CN | 101937165 | 1/2011 |
| CN | 101995750 | 3/2011 |
| CN | 102155639 | 8/2011 |
| CN | 102213383 | 10/2011 |
| CN | 102385233 | 3/2012 |
| CN | 102393598 | 3/2012 |
| CN | 102520569 | 6/2012 |
| CN | 102650809 | 8/2012 |
| CN | 102722073 | 10/2012 |
| CN | 102722075 | 10/2012 |
| CN | 102854729 | 1/2013 |
| CN | 102890398 | 1/2013 |
| CN | 103052841 | 4/2013 |
| CN | 103062672 | 4/2013 |
| CN | 103207507 | 7/2013 |
| CN | 103324015 | 9/2013 |
| CN | 203217230 | 9/2013 |
| CN | 103376634 | 10/2013 |
| CN | 103453448 | 12/2013 |
| CN | 103676428 | 3/2014 |
| CN | 104238248 | 12/2014 |
| CN | 204593250 | 8/2015 |
| CN | 105022214 | 11/2015 |
| CN | 105093795 | 11/2015 |
| CN | 105278226 | 1/2016 |
| CN | 208588892 | 3/2019 |
| CN | 109557750 | 4/2019 |
| EP | 2360523 | 8/2011 |
| JP | 2004341105 | 12/2004 |
| JP | 2011128521 | 6/2011 |
| JP | 2011209555 | 10/2011 |
| JP | 2014075221 | 4/2014 |
| KR | 20130024564 | 3/2013 |
| TW | 580545 | 3/2004 |
| TW | 200408784 | 6/2004 |
| TW | M423266 | 2/2012 |
| TW | M436167 | 8/2012 |
| TW | 201307756 | 2/2013 |
| TW | 201319718 | 5/2013 |
| TW | 201335691 | 9/2013 |
| TW | 201405048 | 2/2014 |
| TW | M482090 | 7/2014 |
| TW | 201512762 | 4/2015 |
| TW | 201546495 | 12/2015 |
| WO | 2013056594 | 4/2013 |
| WO | 2014006206 | 1/2014 |
| WO | 2014046219 | 3/2014 |

OTHER PUBLICATIONS

"Office Action of China Counterpart Application", dated Oct. 27, 2020, p. 1-p. 12.

* cited by examiner

ILLUMINATION SYSTEM HAVING WAVELENGTH CONVERSION DEVICE AND PROJECTION DEVICE HAVING THE SAME

CROSS-REFERENCE TO RELATED APPLICATION

This application claims the priority benefit of China application serial no. 201810750147.0, filed on Jul. 10, 2018. The entirety of the above-mentioned patent application is hereby incorporated by reference herein and made a part of this specification.

BACKGROUND OF THE INVENTION

Field of the Invention

The disclosure relates to an optical system and an optical device, and in particular, to an illumination system and a projection device.

Description of Related Art

As a display device adapted to generate large-size images, the projection device has been constantly improved as technology advances and innovates. The principle of imaging of the projection device involves converting an illumination beam generated by the illumination system into an image beam through a light valve, and then projecting the image beam out of the projection device through a projection lens to form the projection image on a target (e.g., a screen or a wall).

Moreover, in response to the market demands for brightness, color saturation, the lifespan, and non-toxicity and environmental friendliness of the projection device, the projection device has evolved from using the ultra-high-performance lamp (UHP lamp), the light-emitting diode (LED), to the most recent laser diode (LD) as the light source. However, in the illumination system, the more economical method for generating red light and green light currently involves using a blue laser diode to excite the phosphor powder of the phosphor wheel to generate yellow-green light. Then, the optical element filters out the required red light or green light as the illumination beam.

However, in the conventional illumination system framework, optical elements such as a focusing lens set is generally disposed on the transmission path of the blue light to the optical system to enable the blue light to fully enter the phosphor wheel. As a result, the costs remain high and the size cannot be reduced.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides an illumination system and a projection device with a simplified structure and a reduced size.

Other purposes and advantages of the invention may be further understood according to the technical features disclosed herein.

To achieve one, part, or all of the foregoing purposes or other purposes, an embodiment of the invention provides an illumination system including an excitation light source, a first light splitting element, a first light reflecting element, a wavelength conversion device, and a light filtering device, wherein the excitation light source is adapted to provide an excitation beam. The excitation beam includes a first sub-beam and a second sub-beam. The first light splitting element is disposed on a transmission path of the excitation beam, and the first light splitting element includes a first zone and a second zone. The first light reflecting element is disposed on a transmission path of the second sub-beam. The wavelength conversion device is disposed on the transmission path of the excitation beam. The wavelength conversion device includes an optical zone and a wavelength conversion zone. The wavelength conversion device is adapted to rotate around a central axis, such that the optical zone and the wavelength conversion zone alternately enter the transmission path of the excitation beam. The wavelength conversion zone is adapted to convert the excitation beam into a first conversion beam, and a wavelength of the excitation beam is different from a wavelength of the first conversion beam. The light filtering device is disposed on the transmission paths of the excitation beam and the first conversion beam. In a first time period, the optical zone enters the transmission path of the excitation beam, the first sub-beam of the excitation beam is transmitted to the optical zone via the first zone of the first light splitting element, and the second sub-beam of the excitation beam is transmitted to the light filtering device via the first light splitting element and the first light reflecting element. In a second time period, the wavelength conversion zone enters the transmission path of the excitation beam, and the excitation beam is transmitted to the wavelength conversion zone to be converted into the first conversion beam.

To achieve one, part, or all of the foregoing purposes or other purposes, another embodiment of the invention provides a projection device adapted to provide a projection beam. The projection device includes an illumination system providing an illumination beam. The illumination system includes an excitation light source, a first light splitting element, a first light reflecting element, a wavelength conversion device, and a light filtering device, wherein the excitation light source is adapted to provide an excitation beam. The excitation beam includes a first sub-beam and a second sub-beam. The first light splitting element is disposed on a transmission path of the excitation beam, and the first light splitting element includes a first zone and a second zone. The first light reflecting element is disposed on a transmission path of the second sub-beam. The wavelength conversion device is disposed on the transmission path of the excitation beam. The wavelength conversion device includes an optical zone and a wavelength conversion zone. The wavelength conversion device is adapted to rotate around a central axis, such that the optical zone and the wavelength conversion zone alternately enter the transmission path of the excitation beam. The wavelength conversion zone is adapted to convert the excitation beam into a first conversion beam, and a wavelength of the excitation beam is different from a wavelength of the first conversion beam. The light filtering device is disposed on the transmission paths of the excitation beam and the first conversion beam. At least one light valve is disposed on a transmission path of the illumination beam and is adapted to convert the illumination beam into at least one image beam. A lens module is disposed on a transmission path of the at least one image beam and is adapted to receive the at least one image beam and produce the projection beam. In a first time period, the optical zone enters the transmission path of the excitation beam, the first sub-beam of the excitation beam is transmitted to the optical zone via the first zone of the first light splitting element, and the second sub-beam of the excitation beam is transmitted to the light filtering device via the first light splitting element and the first light reflecting element. In a second time period, the wavelength conversion zone enters the transmission path of the excitation beam, and the excitation beam is transmitted to the wavelength conversion zone to be converted into the first conversion beam.

Based on the above, the embodiments of the invention at least exhibit one of the advantages or effects below. In the foregoing embodiments of the invention, since the first sub-beam and the second sub-beam included in the excitation beam may be respectively transmitted to the first light splitting element, the wavelength conversion device, and the light filtering device via different transmission paths, it is not required to dispose an additional optical collimating mirror set on the transmission path of the excitation beam emitted by the excitation light source in the illumination system. Accordingly, the costs can be reduced, the structure can be simplified, and the size can be reduced.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the disclosure, and are incorporated in and constitute a part of this specification. The drawings illustrate exemplary embodiments of the invention and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
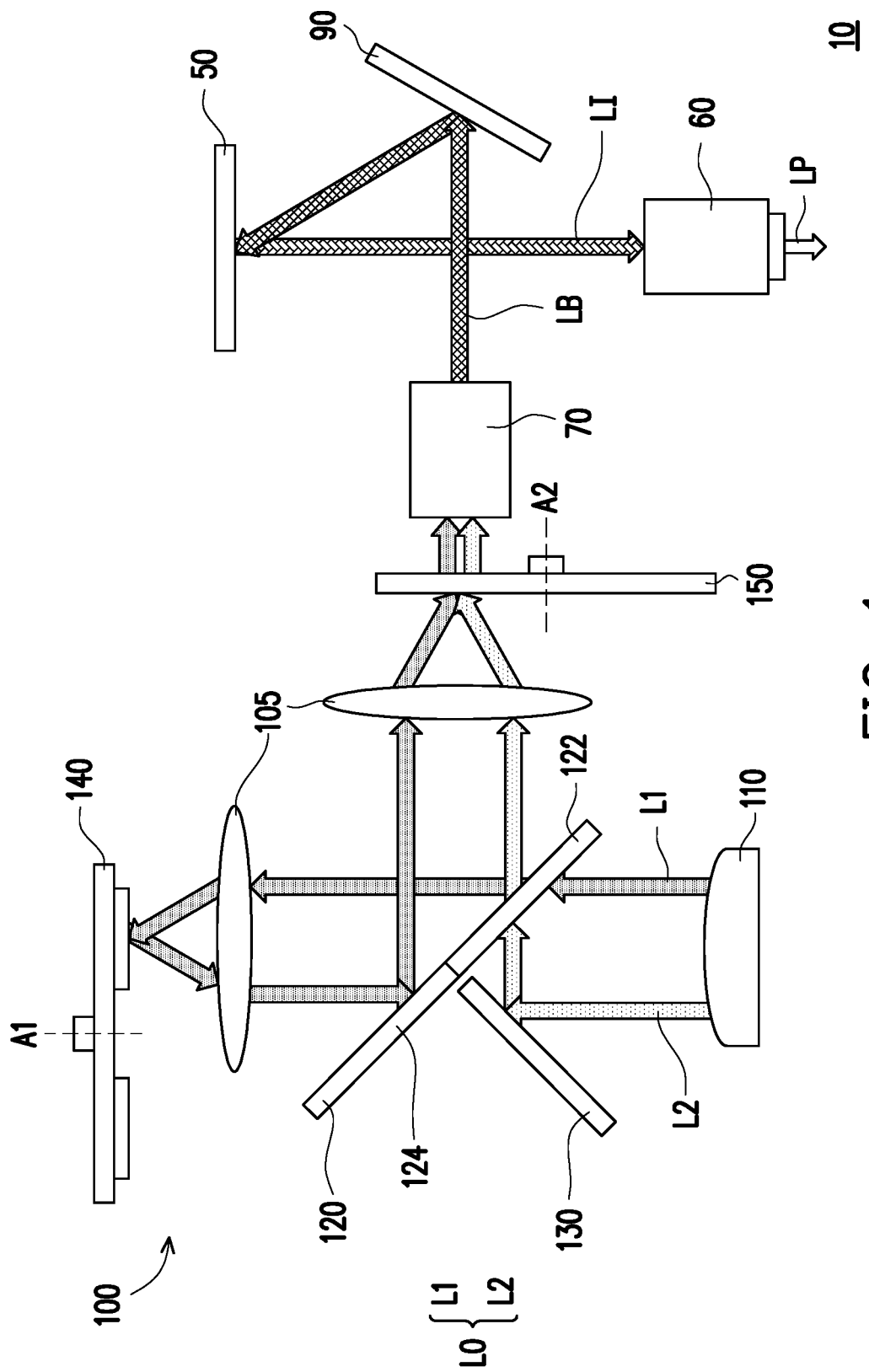
FIG. 1 is a schematic diagram illustrating a projection device according to an embodiment of the invention.

FIG. 1 is a schematic diagram illustrating a projection device according to an embodiment of the invention. Referring to FIG. 1, in the embodiment, a projection device 10 is adapted to provide a projection beam LP. Specifically, the projection device 10 includes an illumination system 100, at least one light valve 50, and a lens module 60. The illumination system 100 is adapted to provide an illumination beam LB. The light valve 50 is disposed on a transmission path of the illumination beam LB and is adapted to convert the illumination beam LB into at least one image beam LI. In other words, the illumination beam LB refers to the beam provided by the illumination system 100 to the light valve 50 at any time (e.g., an excitation beam provided by an excitation light source 110, a conversion beam converted by a wavelength conversion device 140, or a combination thereof). The lens module 60 is disposed on a transmission path of the image beam LI and is adapted to receive the image beam LI and produce the projection beam LP. The projection beam LP is adapted to be projected to a projection target (not shown) such as a screen or a wall.

In the embodiment, the light valve 50 is, for example, a reflective light modulator such as a liquid crystal on silicon panel (LCoS panel), a digital micro-mirror device (DMD), etc. In some embodiments, the light valve 50 may also be a transmissive light modulator such as a transparent liquid crystal panel, an electro-optic modulator, a magneto-optic modulator, an acousto-optic modulator (AOM), etc. The form and type of the light valve 50 are not limited herein. Detailed steps and implementation of the method of converting the illumination beam LB into the image beam LI by the light valve 50 are sufficiently taught, suggested, and described in the common knowledge in the art and are thus not repeatedly described here. In the embodiment, as an example, the projection device 10 uses one single light valve 50 (e.g., one single digital micro-mirror device (1-DMD)). However, in other embodiments, the number of the light valve 50 may be plural, and the invention is not limited thereto.

The lens module 60 includes, for example, a combination of one or more optical lenses having diopters, e.g., including various combinations of non-planar lenses such as a biconcave lens, a biconvex lens, a concave-convex lens, a convex-concave lens, a plano-convex lens, and a plano-concave lens. In an embodiment, the lens module 60 may also include planar optical lenses that receive the image beam LI from the light valve 50 and project the projection beam LP to the projection target by reflection or transmission. The form and type of the lens module 60 are not limited herein.

In the embodiment, the projection device 10 may further include a light homogenizing element 70 that is disposed on the transmission paths of an excitation beam L0 and a conversion beam (e.g., the first conversion beam L3 in FIG. 4) and is adapted to adjust the shape of the speckle pattern to the illumination beam LB, such that the speckle pattern of the illumination beam LB can be in line with the shape (e.g., a rectangle) of the active zone of the light valve 50 and each portion of the speckle pattern can have consistent or similar light intensity. In the embodiment, the light homogenizing element 70 is, for example, an integration rod. However, in other embodiments, the light homogenizing element 70 may also be an optical element in another suitable form, and the invention is not limited thereto.

Moreover, in some embodiments, the projection device 10 may further optionally include a light converging element (not shown) and a reflector 90. The light converging element and the reflector 90 are adapted to guide the illumination beam LB emitted by the illumination system 100 to the light valve 50. However, the invention is not limited thereto. In other embodiments, other optical elements may also be used to guide the illumination beam LB to the light valve 50.

The illumination system 100 includes an excitation light source 110, a first light splitting element 120, a first light reflecting element 130, the wavelength conversion device 140, and a light filtering device 150. Light converging elements 105 are disposed to guide the beam and focus the beam on other elements. The light converging elements 105 are, for example, lenses or collimating mirror sets, but the invention is not limited thereto. Specifically, the excitation light source 110 provides an excitation beam L0, and the excitation beam L0 includes a first sub-beam L1 and a second sub-beam L2. In the embodiment, the excitation light source 110 is a laser diode (LD). However, in other embodiments, the excitation light source 110 may be a light-emitting diode (LED) or an organic light-emitting diode (OLED). Specifically, any light source that meets the requirements of the actual design may all be implemented, and the forms and types of the excitation light source 110 and other light sources in the description below are not limited herein. In the embodiment, the excitation beam L0 is, for example, a blue excitation beam having a peak wavelength of 445 nm or 460 nm.

The first light splitting element 120 is disposed on a transmission path of the excitation beam L0 and is located between the excitation light source 110 and the wavelength conversion device 140. The first light splitting element 120 includes a first zone 122 and a second zone 124. In the embodiment, the first zone 122 is adapted to allow blue light to pass and reflect yellow light, and the second zone 124 is adapted to reflect blue light and yellow light. The first light reflecting element 130 is adapted to reflect a beam of any color and is disposed on a transmission path of the second sub-beam L2. However, in other embodiments, the transmissive or reflective properties of the first zone 122 and the second zone 124 may be adjusted, and the invention is not limited thereto. Specifically, in the embodiment, the first zone 122 and the second zone 124 are disposed to be adjacent to each other, and the first light splitting element 120 and the first light reflecting element 130 are arranged to be perpendicular to each other. Moreover, the first light reflecting element 130 is disposed between the second zone 124 of the first light splitting element 120 and the excitation light source 110. Therefore, the first sub-beam L1 can directly pass through the first zone 122 to be transmitted to other elements on the side of the first light splitting element 120 opposite to the excitation light source 110. The second sub-beam L2 can be reflected by the first light reflecting element 130 and pass through the first zone 122 of the first light splitting element 120 to other elements on the side of the first light splitting element 120 opposite to the first light reflecting element 130, as shown in FIG. 1.

Figure 2A:
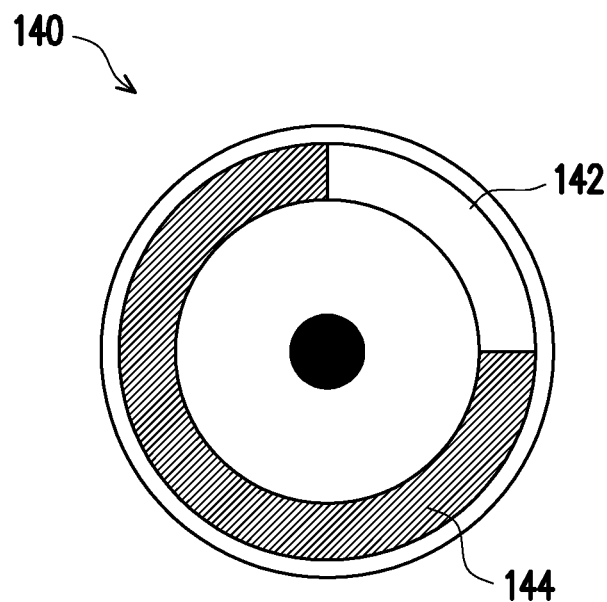
FIG. 2A and FIG. 2B are respectively schematic diagrams illustrating a wavelength conversion device of FIG. 1 in different embodiments.
Figure 2B:
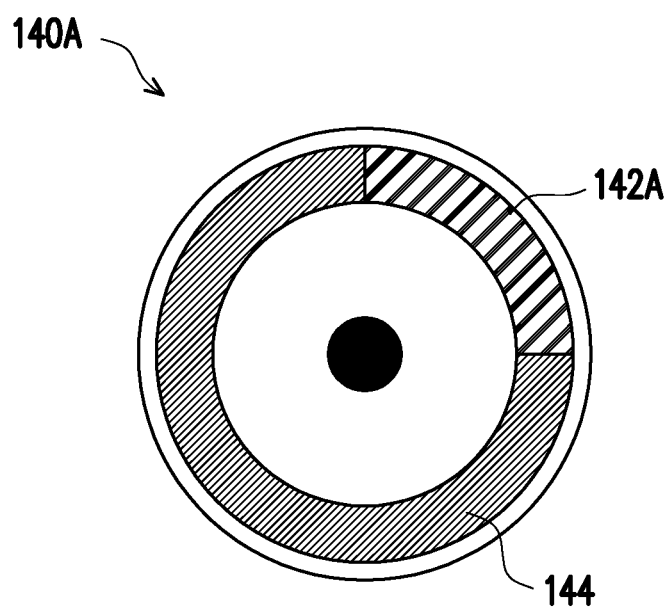
Figure 4:
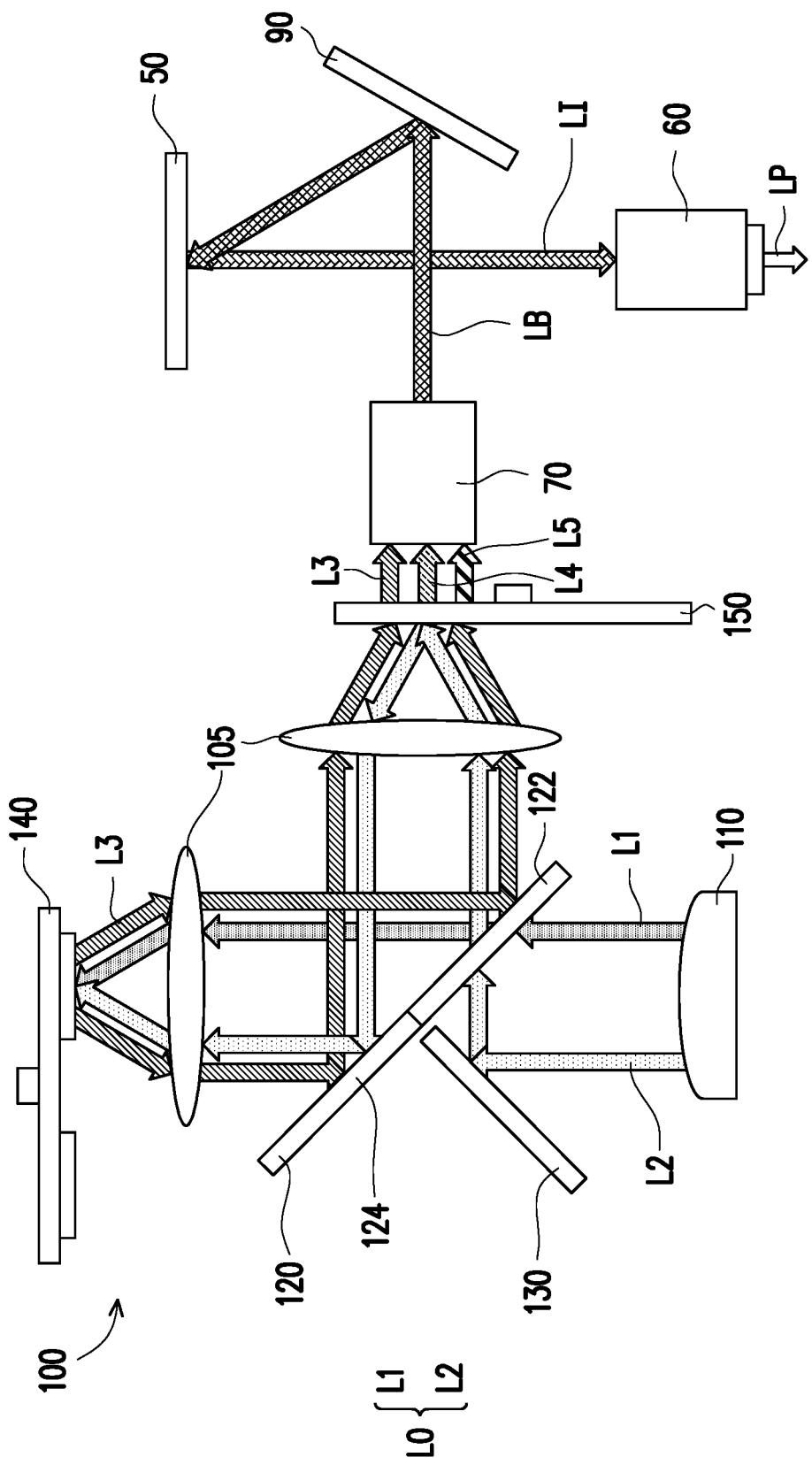
FIG. 4 is a schematic diagram illustrating the projection device of FIG. 1 in another time sequence.

FIG. 2A and FIG. 2B are respectively schematic diagrams illustrating the wavelength conversion device of FIG. 1 in different embodiments. FIG. 4 is a schematic diagram illustrating the projection device of FIG. 1 in another time sequence. Referring to FIG. 1, FIG. 2A, and FIG. 4, the wavelength conversion device 140 is disposed on the transmission path of the excitation beam L0, and the wavelength conversion device 140 includes an optical zone 142 and a wavelength conversion zone 144. The wavelength conversion device 140 is adapted to rotate around a central axis A1, such that the optical zone 142 and the wavelength conversion zone 144 alternately enter the transmission path of the excitation beam L0. In the embodiment, the optical zone 142 is, for example, a reflection mirror adapted to reflect the excitation beam L0, the wavelength conversion zone 144 is adapted to convert the excitation beam L0 into a first conversion beam L3, and the wavelength of the excitation beam L0 is different from the wavelength of the first conversion beam L3, as shown in FIG. 2A. For example, the wavelength conversion zone 144 includes a wavelength conversion material (e.g., a yellow phosphor powder) that can excite yellow light, so the wavelength conversion zone 144 can convert the excitation beam L0 into the first conversion beam L3 presented as a yellow light. Referring to FIG. 2B, in another embodiment, an optical zone 142A includes, for example, a wavelength conversion material different from the wavelength conversion zone 144, such as a wavelength conversion material (e.g., a green phosphor powder) that can excite green light, as shown in a wavelength conversion device 140A in FIG. 2B. The optical zone 142A is adapted to convert the excitation beam L0 into a second conversion beam (not shown) presented as a green light or is adapted to convert a portion of the excitation beam L0 into a second conversion beam (not shown) presented as a green light, and the second conversion beam may form a blue-green light with another portion of the excitation beam L0 which is unconverted. Accordingly, the issue of blue light color dots can be further improved, and optical quality can thereby be enhanced, but the invention is not limited thereto.

Figure 3A:
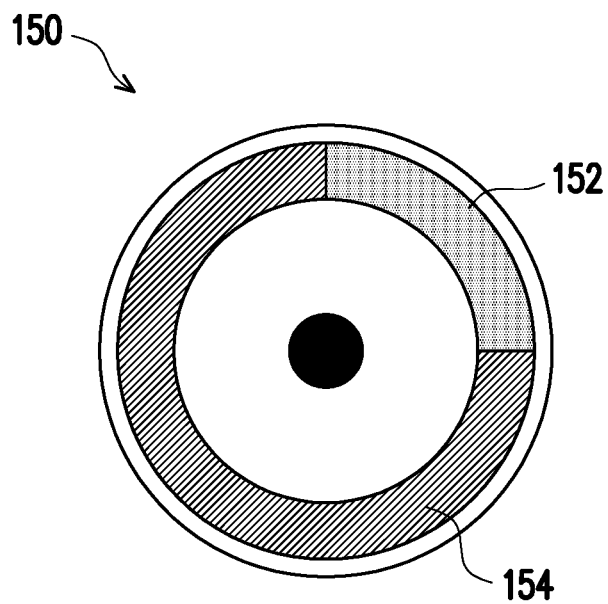
FIG. 3A and FIG. 3B are respectively schematic diagrams illustrating a light filtering device of FIG. 1 in different embodiments.
Figure 3B:
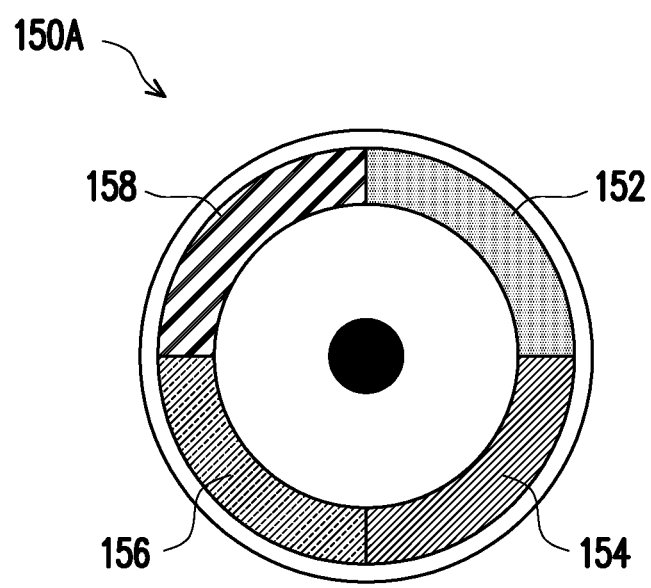

FIG. 3A and FIG. 3B are respectively schematic diagrams illustrating the light filtering device of FIG. 1 in different embodiments. Referring to FIG. 1, FIG. 2A, FIG. 3A, and FIG. 4, in the embodiment, the light filtering device 150 is disposed on the transmission paths of the excitation beam L0 and the first conversion beam L3 and is adapted to reflect the excitation beam L0 and allow the first conversion beam L3 to pass therethrough. Specifically, the light filtering device 150 includes a first light filtering zone 152 and a second light filtering zone 154 and is adapted to rotate around a central axis A2, such that the first light filtering zone 152 and the second light filtering zone 154 of the light filtering device 150 alternately enter the transmission path of the second sub-beam L2. In the embodiment, the first light filtering zone 152 is disposed as, for example, a blue light filter, and the second light filtering zone 154 is disposed as, for example, a yellow light filter, a red light filter, or a green light filter, as shown in FIG. 3A. In another embodiment, the light filtering device 150 may further include a third light filtering zone 156 and a fourth light filtering zone 158, and the second light filtering zone 154, the third light filtering zone 156, and the fourth light filtering zone 158 are respectively disposed as a yellow light filter, a red light filter, or a green light filter, as shown in a light filtering device 150A in FIG. 3B. The second light filtering zone 154, the third light filtering zone 156, and the fourth light filtering zone 158 of the light filtering device 150A alternately enter the transmission path of the first conversion beam L3. Therefore, the first conversion beam L3 passes through the second light filtering zone 154, the first conversion beam L3 passes through the third light filtering zone 156 and forms a first light filtering beam L4, and the first conversion beam L3 passes through the fourth light filtering zone 158 and forms a second light filtering beam L5. Specifically, the first conversion beam L3 is, for example, a yellow beam, the first light filtering beam L4 is, for example, a red beam, and the second light filtering beam L5 is, for example, a green beam to be applicable to the projection device 10 having different numbers of the light valves 50, but the invention is not limited thereto.

Specifically, in the embodiment, the operation of the projection device 10 may be divided into a first time period and a second time period. In the first time period, the optical zone 142 of the wavelength conversion device 140 enters the transmission path of the excitation beam L0. Therefore, the first sub-beam L1 of the excitation beam L0 is transmitted to the optical zone 142 of the wavelength conversion device 140 via the first zone 122 of the first light splitting element 120 and is reflected to the second zone 124 of the first light splitting element 120, and then is reflected by the second zone 124 and transmitted to pass through the first light filtering zone 152 of the light filtering device 150 to form a part of the blue light portion in the illumination beam LB. Meanwhile, the second sub-beam L2 of the excitation beam L0 is reflected by the first light reflecting element 130 and then sequentially passes through the first zone 122 of the first light splitting element 120 and the first light filtering zone 152 of the light filtering device 150 to form another part of the blue light portion in the illumination beam LB, as shown in FIG. 1.

In the second timeperiod, the wavelength conversion zone 144 of the wavelength conversion device 140 enters the transmission path of the excitation beam L0. Therefore, the first sub-beam L1 of the excitation beam L0 is transmitted to pass through the first zone 122 of the first light splitting element 120 to the wavelength conversion zone 144 and is converted into the first conversion beam L3. The first conversion beam L3 is reflected by the wavelength conversion device 140 back to the first light splitting element 120 and is reflected by the first light splitting element 120 and transmitted to pass through the second light filtering zone 152 of the light filtering device 150 to form a part of the yellow light, red light, or green light portion in the illumination beam LB. The second sub-beam L2 of the excitation beam L0 is reflected by the first light reflecting element 130 to pass through the first zone 122 of the first light splitting element 120. At this time, the second light filtering zone 154 of the light filtering device 150 enters the transmission path of the second sub-beam L2. The second sub-beam L2 from the first zone 122 is sequentially reflected by the second light filtering zone 154 of the light filtering device 150 and the first light splitting element 120 to the wavelength conversion zone 144 to be converted into the first conversion beam L3. The first conversion beam L3 is reflected by the wavelength conversion device 140 back to the first light splitting element 120 and is reflected by the first light splitting element 120 and transmitted to pass through the second light filtering zone 152 of the light filtering device 150 to form another part of the yellow light, red light, or green light portion in the illumination beam LB. Accordingly, it is not required to dispose an additional optical collimating mirror set on the transmission path of the excitation beam L0 emitted by the excitation light source 110, which further reduces the costs, simplifies the structure, and reduces the size.

Figure 5:
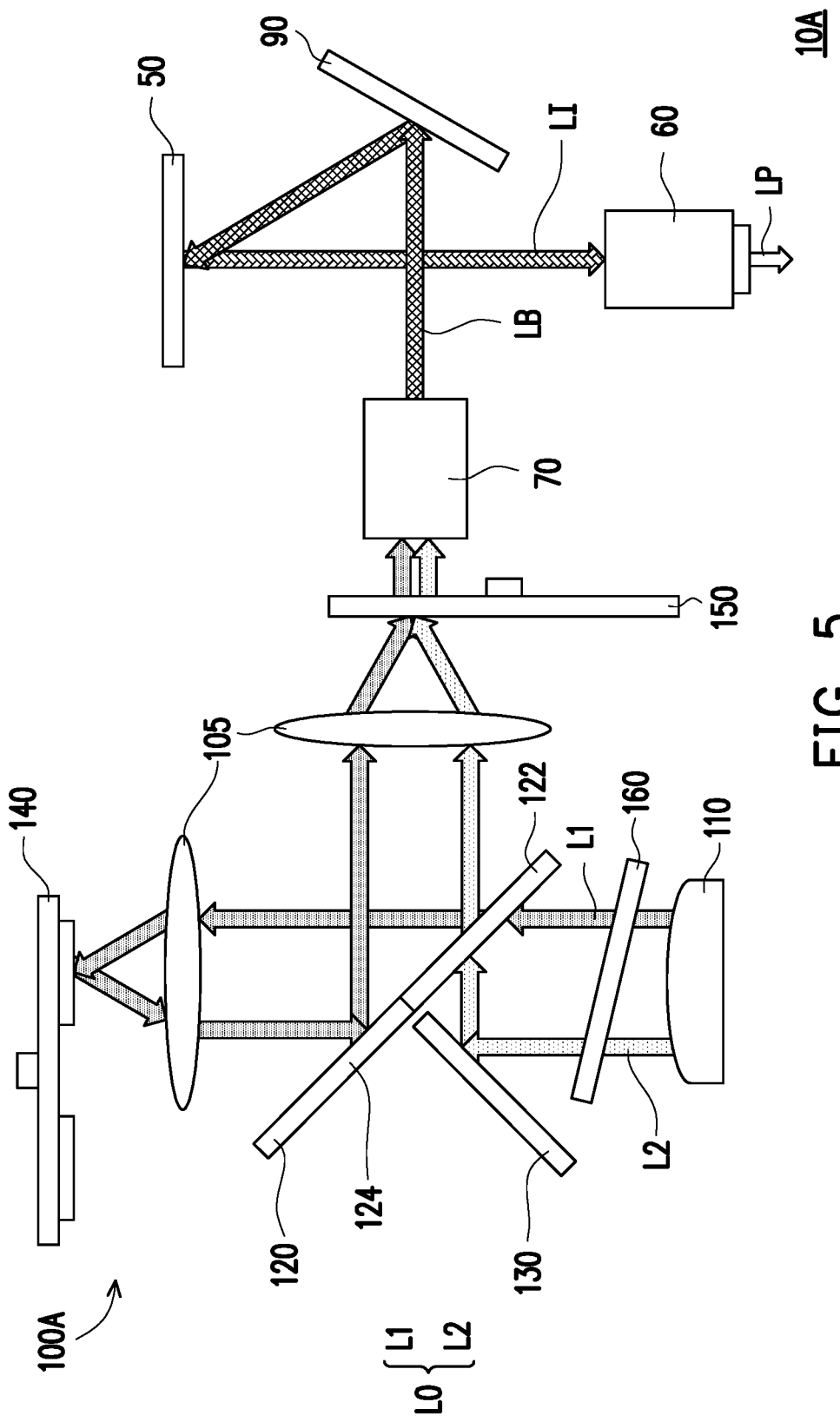
FIG. 5 is a schematic diagram illustrating a projection device according to another embodiment of the invention.

FIG. 5 is a schematic diagram illustrating a projection device according to another embodiment of the invention. Referring to FIG. 5, an illumination system 100A and a projection device 10A of the embodiment are similar to the illumination system 100 and the projection device 10 of FIG. 1. The difference between the two lies in that, in the embodiment, the illumination system 100A further includes a diffusion element 160 that is disposed between the excitation light source 110 and the first light splitting element 120 and is adapted to allow the excitation beam L0 to pass. Specifically, an included angle between the extension direction of the diffusion element 160 and the transmission direction of the excitation beam L0 may be smaller than or equal to 90 degrees. Therefore, the excitation beam L0 can be homogeneously diffused by the diffusion element 160. In an embodiment where the included angle is smaller than 90 degrees, the size and shape of the speckle pattern of the excitation beam L0 may be further adjusted. For example, the speckle pattern of the excitation beam L0 passing through the diffusion element 160 may be adjusted to an elliptical shape to further enhance the optical efficiency in subsequent operations.

Figure 6:
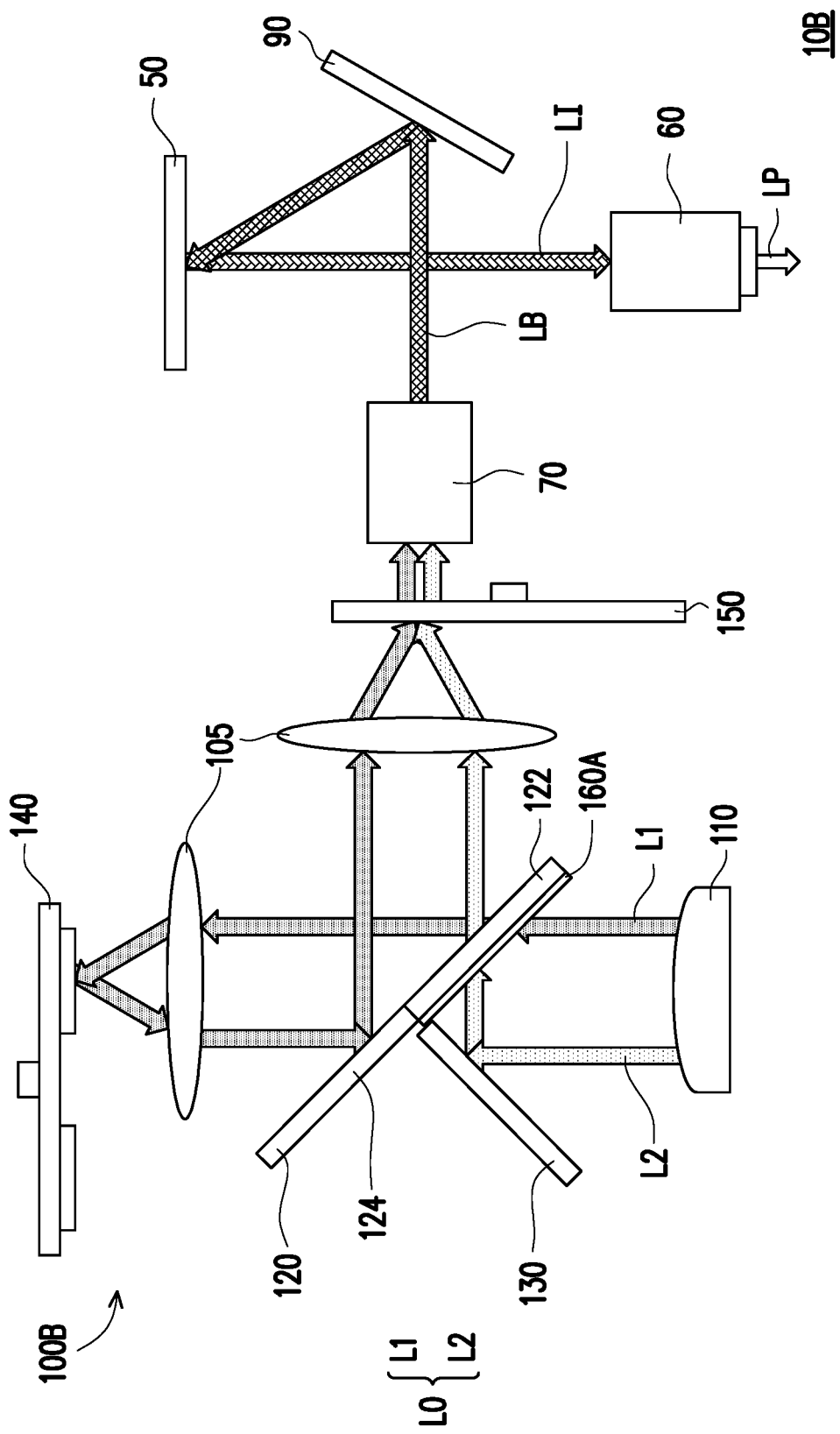
FIG. 6 is a schematic diagram illustrating a projection device according to another embodiment of the invention.

FIG. 6 is a schematic diagram illustrating a projection device according to another embodiment of the invention. An illumination system 100B and a projection device 10B of the embodiment are similar to the illumination system 100A and the projection device 10A of FIG. 5. The difference between the two lies in that, in the embodiment, the illumination system 100B further includes a diffusion element 160A that is disposed between the excitation light source 110 and the first light splitting element 120 and is disposed on the first zone 122 of the first light splitting element 120. For example, in the embodiment, the diffusion element 160A is a diffusion layer formed on the first zone 122 by plating or coating, but the invention is not limited hereto.

Figure 7:
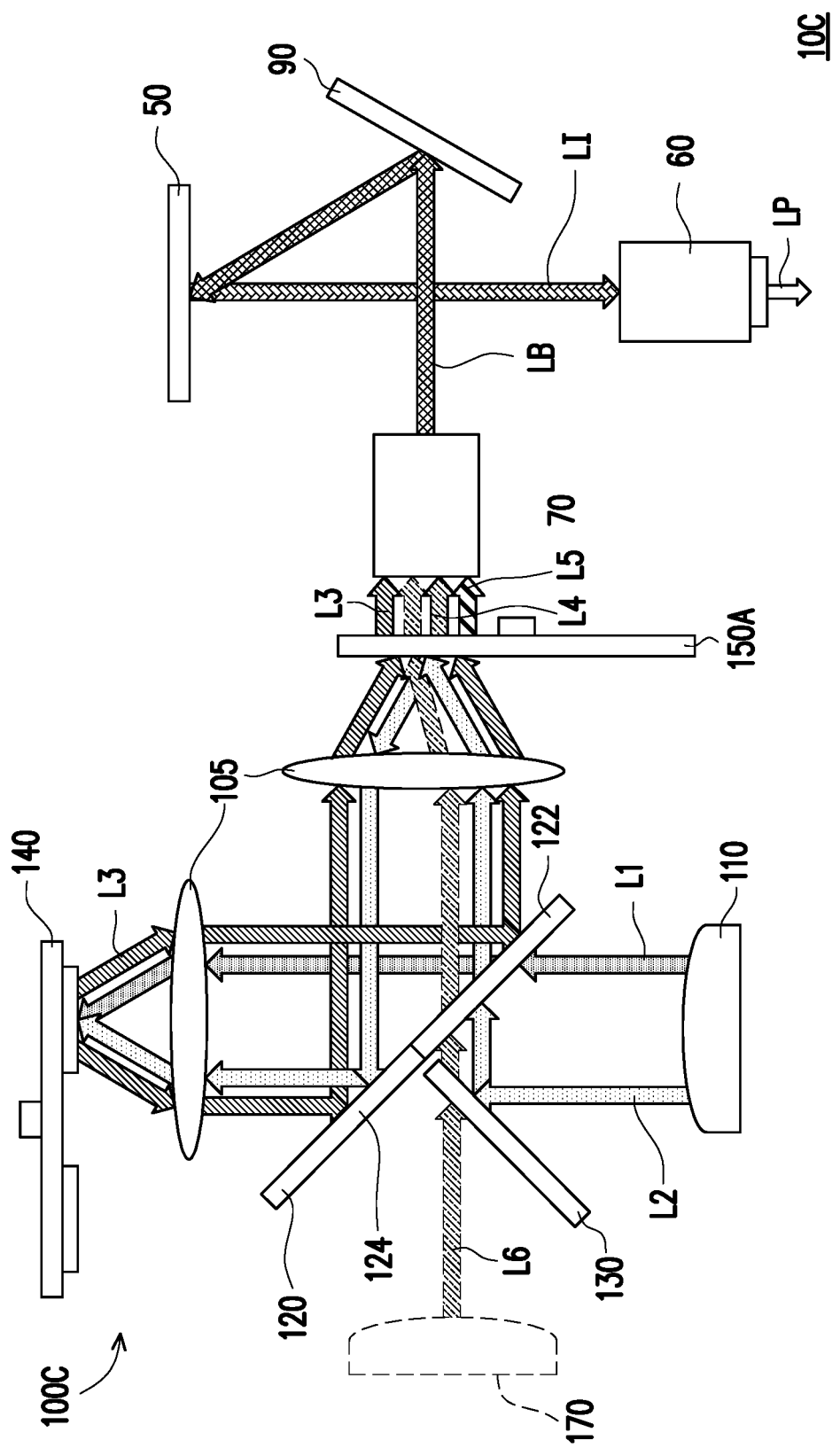
FIG. 7 is a schematic diagram illustrating a projection device according to another embodiment of the invention.

FIG. 7 is a schematic diagram illustrating a projection device according to another embodiment of the invention.

Referring to FIG. 7, an illumination system 100C and a projection device 10C of the embodiment are similar to the illumination system 100 and the projection device 10 of FIG. 1. The difference between the two lies in that, in the embodiment, the illumination system 100C further includes a supplementary light source 170. The supplementary light source 170 is adapted to provide a supplementary beam L6, and the wavelength of the supplementary beam L6 is different from the wavelength of the excitation beam L0. Specifically, the supplementary light source 170 is, for example, a light source that can emit red light, and the supplementary beam L6 is a red beam. In the embodiment, the supplementary light source 170 is, for example, a laser light source that can emit red light, and the supplementary beam L6 is a red excitation beam, but the invention is not limited thereto. In the projection device 10C of the embodiment, in the second timeperiod, the supplementary beam L6 sequentially passes through the first light reflecting element 130 and the first light splitting element 120 to be transmitted to the light filtering device 150. In other words, in the embodiment, the first zone 122 of the first light splitting element 120 is adapted, for example, to allow blue light and red light to pass therethrough and reflect yellow light, and the first light reflecting element 130 is, for example, a dichroic mirror that allows red light to pass and reflects blue light. When the wavelength conversion zone 144 of the wavelength conversion device 140 enters the transmission path of the excitation beam L0, the first sub-beam L1 of the excitation beam L0 passes through the first zone 122 of the first light splitting element 120 to be transmitted to the wavelength conversion zone 144 and is converted into the first conversion beam L3. The first conversion beam L3 is reflected by the wavelength conversion device 140 back to the first light splitting element 120 and is reflected by the first light splitting element 120 and transmitted to pass through the third light filtering zone 156 (which is, for example, a red light filter) of the light filtering device 150A as shown in FIG. 3B to form a part of the red light portion in the illumination beam LB. The second sub-beam L2 of the excitation beam L0 is reflected by the first light reflecting element 130 to pass through the first zone 122 of the first light splitting element 120. At this time, the third light filtering zone 156 of the light filtering device 150A as shown in FIG. 3B enters the transmission path of the second sub-beam L2. The second sub-beam L2 from the first zone 122 is sequentially reflected by the third light filtering zone 156 and the first light splitting element 120 to the wavelength conversion zone 144 to be converted into the first conversion beam L3. The first conversion beam L3 is reflected by the wavelength conversion device 140 back to the first light splitting element 120 and is reflected by the first light splitting element 120 and transmitted to pass through the third light filtering zone 156 of the light filtering device 150A as shown in FIG. 3B to form a part of the red light in the illumination beam LB. Meanwhile, the supplementary light source 170 is started and emits the supplementary beam L6, and the supplementary beam L6 sequentially passes through the first light reflecting element 130, the first zone 122 of the first light splitting element 120, and the third light filtering zone 156 to form another portion of the red light in the illumination beam LB. Accordingly, the color gamut of the projection device 10C can be further increased, and excellent display effect can thereby be achieved.

Figure 8:
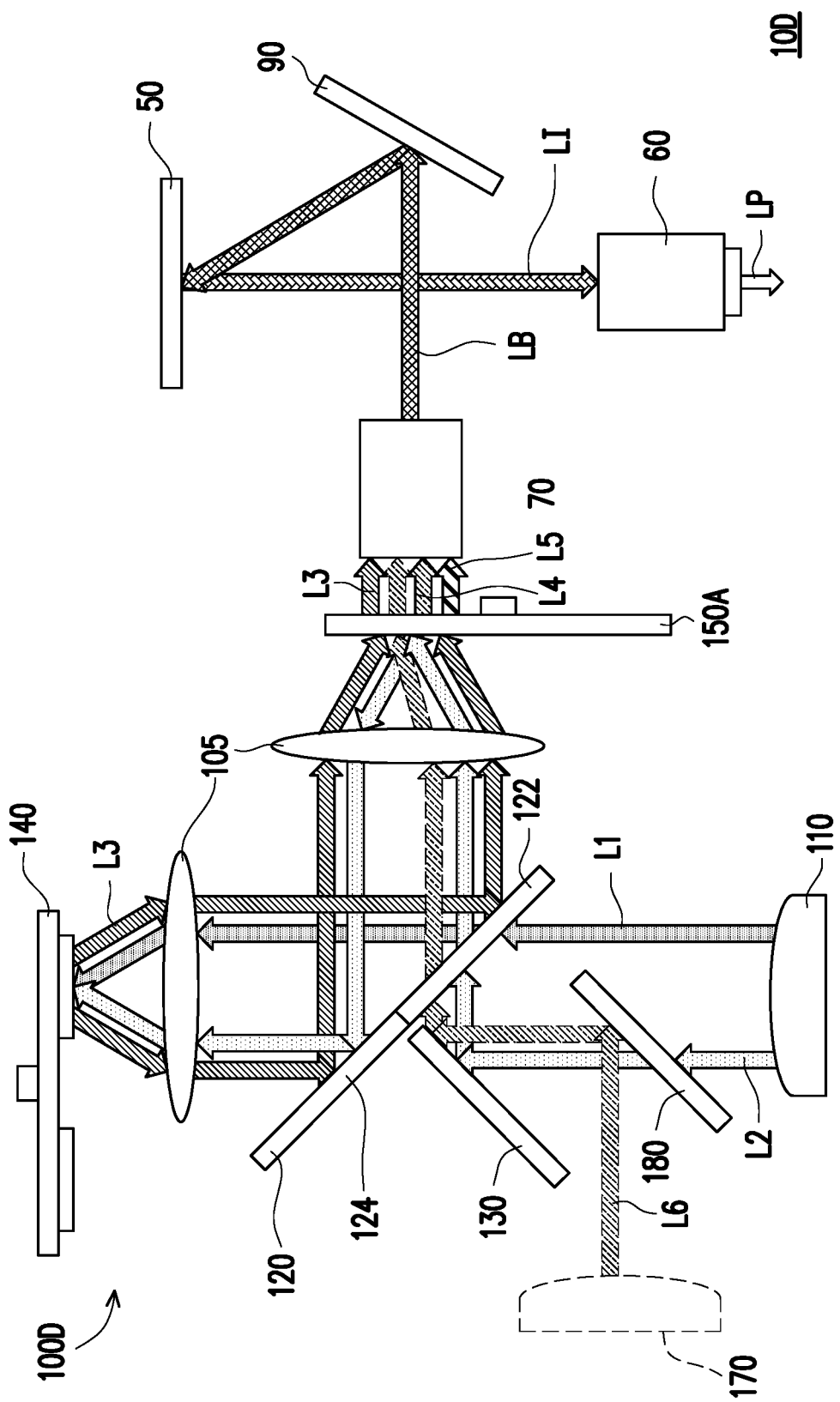
FIG. 8 is a schematic diagram illustrating a projection device according to another embodiment of the invention.

FIG. 8 is a schematic diagram illustrating a projection device according to another embodiment of the invention. Referring to FIG. 8, an illumination system 100D and a projection device 10D of the embodiment are similar to the illumination system 100C and the projection device 10C of FIG. 7. The difference between the two lies in that, in the embodiment, the illumination system 100D further includes a second light splitting element 180. The second light splitting element 180 is, for example, a dichroic mirror that allows blue light to pass therethrough and reflects red light and is disposed on the transmission path of the supplementary beam L6. The first light reflecting element 130 is, for example, a reflection mirror that reflects all beams. The second sub-beam L2 of the excitation beam L0 passes through the second light splitting element 180 and is reflected by the first light reflecting element 130 to pass through the first zone 122 of the first light splitting element 120. The supplementary light source 170 is started and emits the supplementary beam L6. The supplementary beam L6 is reflected by the second light splitting element 180 to the first light reflecting element 130, is reflected by the first light reflecting element 130 to pass through the first zone 122 of the first light splitting element 120, and is then transmitted to the third light filtering zone 156 as shown in FIG. 3B to form a part of the red light in the illumination beam LB. Accordingly, the color gamut of the projection device 10D can be further increased, and excellent display effect can thereby be achieved.

Figure 9:
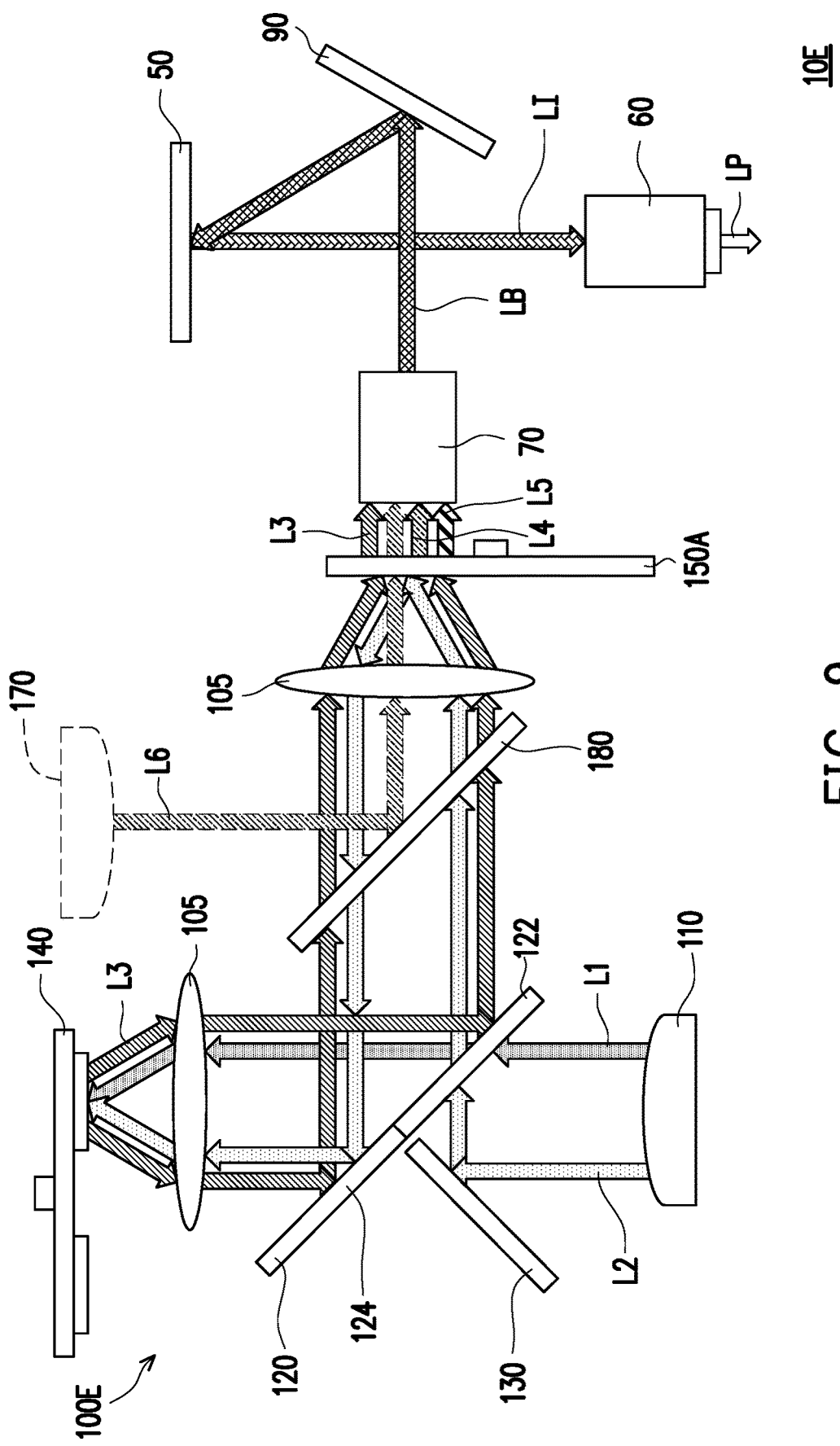
FIG. 9 is a schematic diagram illustrating a projection device according to another embodiment of the invention.

FIG. 9 is a schematic diagram illustrating a projection device according to another embodiment of the invention. Referring to FIG. 9, an illumination system 100E and a projection device 10E of the embodiment are similar to the illumination system 100C and the projection device 10C of FIG. 7. The difference between the two lies in that, in the embodiment, the illumination system 100E further includes a second light splitting element 180. The second light splitting element 180 is, for example, a dichroic mirror that allows blue light and yellow light to pass therethrough and reflects red light and is disposed on the transmission paths of the supplementary beam L6 and the first conversion beam L3. The first light reflecting element 130 is, for example, a reflection mirror that reflects all beams. The excitation beam L0 and the first conversion beam L3 pass through the second light splitting element 180. The supplementary light source 170 is started and emits the supplementary beam L6. The supplementary beam L6 is reflected by the second light splitting element 180 to the third light filtering zone 156 of the light filtering device 150A as shown in FIG. 3B to form a part of the red light in the illumination beam LB. Accordingly, the color gamut of the projection device 10E can be further increased, and excellent display effect can thereby be achieved.

Figure 10:
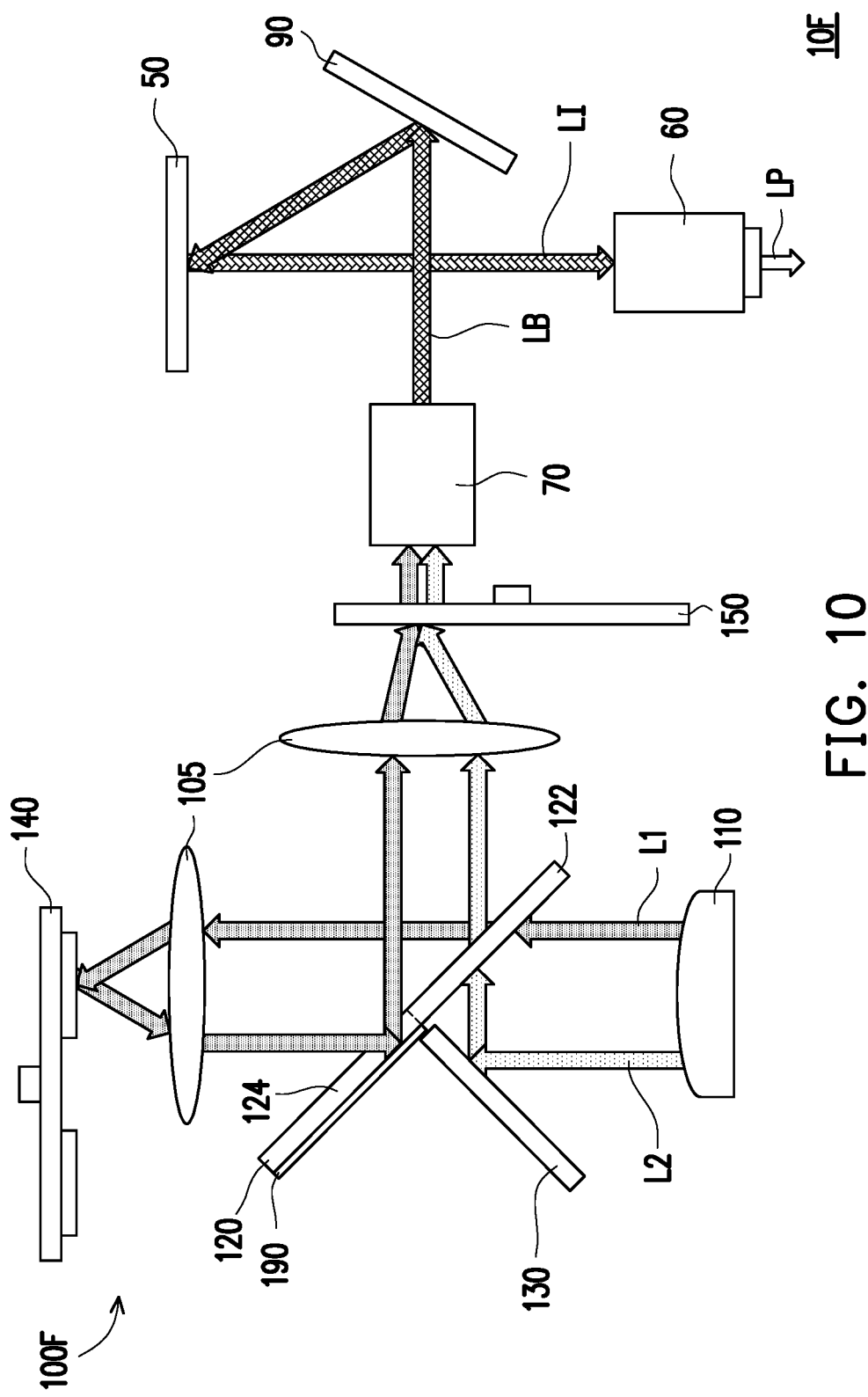
FIG. 10 is a schematic diagram illustrating a projection device according to another embodiment of the invention.

FIG. 10 is a schematic diagram illustrating a projection device according to another embodiment of the invention. Referring to FIG. 10, an illumination system 100F and a projection device 10F of the embodiment are similar to the illumination system 100 and the projection device 10 of FIG. 1. The difference between the two lies in that, in the embodiment, the illumination system 100F further includes a second light reflecting element 190 that is disposed on the second zone 124 of the first light splitting element 120. The second light reflecting element 190 is located between the second zone 124 of the first light splitting element 120 and the first light reflecting element 130. Specifically, in the embodiment, the first light splitting element 120 is actually a dichroic mirror in which both the first zone 122 and the second zone 124 allow blue light to pass therethrough and reflect yellow light. In other words, in the first timeperiod, the optical zone 142 of the wavelength conversion device 140 as shown in FIG. 2A enters the transmission path of the excitation beam L0. The first sub-beam L1 of the excitation beam L0 is transmitted to the optical zone 142 via the first zone 122 of the first light splitting element 120 and is reflected to the second zone 124 of the first light splitting element 120. The first sub-beam L1 reflected by the wavelength conversion device 140 passes through the first light splitting element 120 and is reflected by the second light reflecting element 190 to be transmitted to the light filtering device 150. Accordingly, the manufacture of the first light splitting element 120 can be simplified, and meanwhile the optical tolerance issue at the time of assembling the wavelength conversion device 140 and the first light splitting element 120 can be mitigated.

Figure 11:
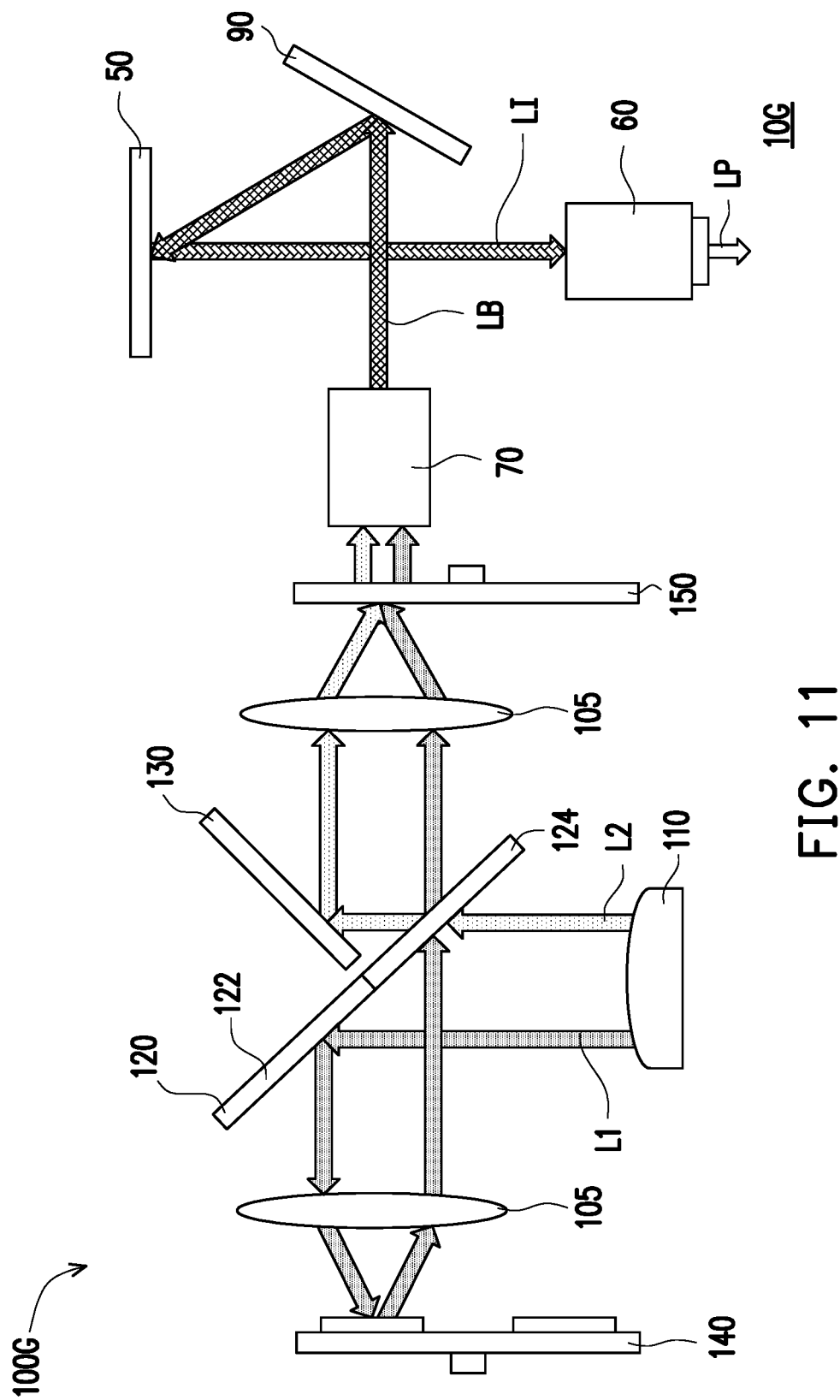
FIG. 11 is a schematic diagram illustrating a projection device according to another embodiment of the invention.
Figure 12:
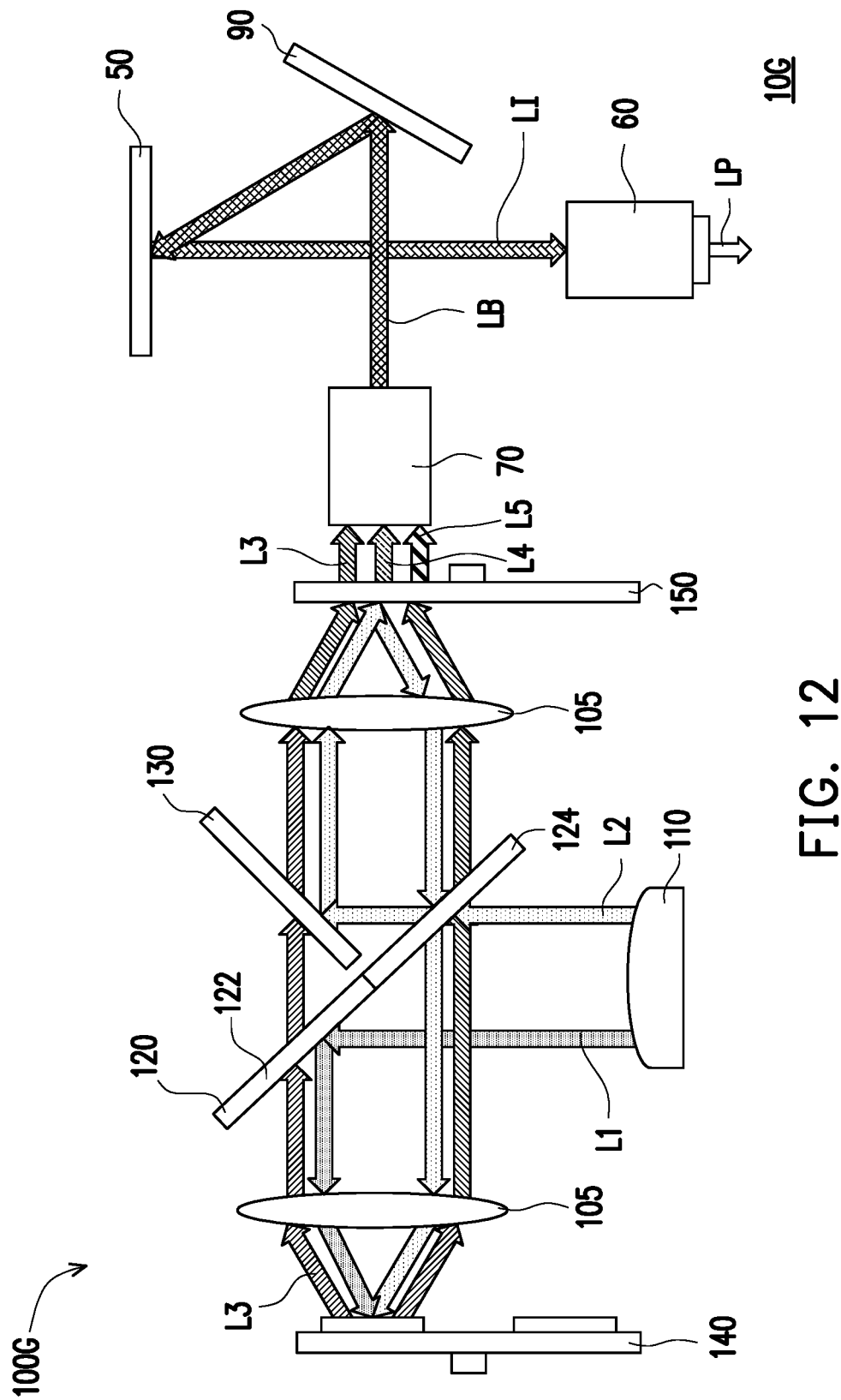
FIG. 12 is a schematic diagram illustrating the projection device of FIG. 11 in another time sequence.

FIG. 11 is a schematic diagram illustrating a projection device according to another embodiment of the invention. FIG. 12 is a schematic diagram illustrating the projection device of FIG. 11 in another time sequence. Referring to FIG. 11 and FIG. 12, an illumination system 100G and a projection device 10G of the embodiment are similar to the illumination system 100 and the projection device 10 of FIG. 1. The difference between the two lies in that, in the embodiment, the first zone 122 of the first light splitting element 120 is adapted to reflect the first sub-beam L1 and allow the first conversion beam L3 to pass therethrough, namely, reflecting blue light and allowing yellow light to pass therethrough. The second zone 124 of the first light splitting element 120 is adapted to allow the excitation beam L0 and the first conversion beam L3 to pass therethrough, namely, allowing all beams to pass therethrough. Specifically, in the embodiment, the second zone 124 of the first light splitting element 120 is disposed between the first light reflecting element 130 and the excitation light source 110. The first zone 122 of the first light splitting element 120 is adapted to reflect the first sub-beam L1 and allow the first conversion beam L3 to pass therethrough. The second zone 124 of the first light splitting element 120 is adapted to allow the second sub-beam L2 and the first conversion beam L3 to pass therethrough. The wavelength conversion device 140 and the light filtering device 150 are disposed on two opposite sides of the first light splitting element 120.

Referring to FIG. 12, FIG. 2A, and FIG. 3A, in the first time period, the optical zone 142 of the wavelength conversion device 140 enters the transmission path of the excitation beam L0. The first sub-beam L1 from the excitation light source 110 is reflected by the first zone 122 and the wavelength conversion device 140 to pass through the light filtering device 150. The second sub-beam L2 is transmitted to pass through the second zone 124 to the first light reflecting element 130 and is reflected by the first light reflecting element 130 to pass through the light filtering device 150. In the second time period, the wavelength conversion zone 144 of the wavelength conversion device 140 enters the transmission path of the excitation beam L0. The first sub-beam L1 is reflected by the first zone 122 of the first light splitting element 120 to the wavelength conversion zone 144 of the wavelength conversion device 140 to be converted into the first conversion beam L3. The second sub-beam L2 is transmitted to pass through the second zone 124 of the first light splitting element 120 to the first light reflecting element 130 and is sequentially reflected by the first light reflecting element 130 and the second light filtering zone 154 of the light filtering device 150 to pass through the second zone 124 to the wavelength conversion zone 144 of the wavelength conversion device 140 to be converted into the first conversion beam L3. The first conversion beam L3 is transmitted to pass through the first light splitting element 120 to the light filtering device 150. The implementation details are sufficiently taught, suggested, and described in the common knowledge in the art and are thus not repeatedly described here.

In summary of the above, the embodiments of the invention at least exhibit one of the advantages or effects below. In the foregoing embodiments of the invention, since the first sub-beam and the second sub-beam included in the excitation beam may be respectively transmitted to the first light splitting element, the wavelength conversion device, and the light filtering device via different transmission paths, it is not required to dispose an additional optical collimating mirror set on the transmission path of the excitation beam emitted by the excitation light source in the illumination system. Accordingly, the costs can be reduced, the structure can be simplified, the size can be reduced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the disclosure is intended to be dedicated to the public regardless of whether the element or component is explicitly recited in the following claims.

What is claimed is:

1. An illumination system comprising: an excitation light source, a first light splitting element, a first light reflecting element, a wavelength conversion device, and a light filtering device, wherein the excitation light source is adapted to provide an excitation beam, and the excitation beam comprises a first sub-beam and a second sub-beam;

the first light splitting element is disposed on a transmission path of the excitation beam, and the first light splitting element comprises a first zone and a second zone;

the first light reflecting element is disposed on a transmission path of the second sub-beam;

the wavelength conversion device is disposed on the transmission path of the excitation beam, and the wavelength conversion device comprises an optical zone and a wavelength conversion zone, wherein the wavelength conversion device is adapted to rotate around a central axis, such that the optical zone and the wavelength conversion zone alternately enter the transmission path of the excitation beam, the wavelength conversion zone is adapted to convert the excitation beam into a first conversion beam, and a wavelength of the excitation beam is different from a wavelength of the first conversion beam; and the light filtering device is disposed on the transmission paths of the excitation beam and the first conversion beam, wherein in a first time period, the optical zone enters the transmission path of the excitation beam, the first sub-beam of the excitation beam is transmitted to the optical zone via the first zone of the first light splitting element, and the second sub-beam of the excitation beam is transmitted to the light filtering device via the first light splitting element and the first light reflecting element, and in a second time period, the wavelength conversion zone enters the transmission path of the excitation beam, and the excitation beam is transmitted to the wavelength conversion zone to be converted into the first conversion beam.

2. The illumination system according to claim 1, wherein the first zone of the first light splitting element is adapted to allow the excitation beam to pass therethrough and reflect the first conversion beam, and the second zone of the first light splitting element is adapted to reflect the excitation beam and the first conversion beam.

3. The illumination system according to claim 1, wherein the first zone of the first light splitting element is adapted to reflect the first sub-beam and allow the first conversion beam to pass therethrough, and the second zone of the first light splitting element is adapted to allow the excitation beam and the first conversion beam to pass.

4. The illumination system according to claim 1, further comprising:
a diffusion element, disposed between the excitation light source and the first light splitting element and adapted to allow the excitation beam to pass therethrough.

5. The illumination system according to claim 1, wherein the first sub-beam of the excitation beam is transmitted to the optical zone of the wavelength conversion device via the first zone of the first light splitting element and is reflected by the optical zone to the second zone of the first light splitting element.

6. The illumination system according to claim 1, wherein the optical zone of the wavelength conversion device comprises a wavelength conversion material, the first sub-beam of the excitation beam is transmitted to the optical zone of the wavelength conversion device, at least a portion of the first sub-beam is converted into a second conversion beam, and the wavelength of the first conversion beam is different from a wavelength of the second conversion beam.

7. The illumination system according to claim 1, further comprising:
a second light reflecting element disposed on the second zone of the first light splitting element, wherein the second light reflecting element is located between the first light splitting element and the first light reflecting element.

8. The illumination system according to claim 1, further comprising:
a supplementary light source adapted to provide a supplementary beam, wherein the supplementary beam sequentially passes through the first light reflecting element and the first light splitting element to be transmitted to the light filtering device, and a wavelength of the supplementary beam is different from the wavelength of the excitation beam.

9. The illumination system according to claim 1, further comprising:
a supplementary light source adapted to provide a supplementary beam; and
a second light splitting element disposed on the transmission paths of the supplementary beam and the first conversion beam, wherein the excitation beam and the first conversion beam pass through the second light splitting element, the supplementary beam is reflected by the second light splitting element to the light filtering device, and a wavelength of the supplementary beam is different from the wavelength of the excitation beam.

10. The illumination system according to claim 1, wherein the light filtering device comprises a first light filtering zone and a second light filtering zone, and the light filtering device is adapted to rotate around a central axis, such that the first light filtering zone and the second light filtering zone of the light filtering device alternately enter the transmission path of the second sub-beam.

11. The illumination system according to claim 10, wherein in the first time period, at least a portion of the first sub-beam from the optical zone and the second sub-beam from the first light reflecting element are transmitted to the first light filtering zone, and in the second time period, the first conversion beam from the wavelength conversion zone is transmitted to the second light filtering zone.

12. The illumination system according to claim 11, wherein in the second time period, the first sub-beam is transmitted to the wavelength conversion zone via the first zone of the first light splitting element and is converted into a portion of the first conversion beam, the portion of the first conversion beam is reflected by the wavelength conversion zone and is transmitted to the second light filtering zone via the first light splitting element, the second sub-beam is transmitted to the second light filtering zone of the light filtering device via the first light reflecting element, the second sub-beam is reflected by the second light filtering zone and then is transmitted to the wavelength conversion zone and converted into another portion of the first conversion beam, and the another portion of the first conversion beam is reflected by the wavelength conversion zone and is transmitted to the second light filtering zone via the first light splitting element.

13. A projection device adapted to provide a projection beam, comprising:
an illumination system providing an illumination beam, comprising: an excitation light source, a first light splitting element, a first light reflecting element, a wavelength conversion device, and a light filtering device, wherein
the excitation light source is adapted to provide an excitation beam, and the excitation beam comprises a first sub-beam and a second sub-beam;
the first light splitting element is disposed on a transmission path of the excitation beam, and the first light splitting element comprises a first zone and a second zone;

the first light reflecting element is disposed on a transmission path of the second sub-beam;

the wavelength conversion device is disposed on the transmission path of the excitation beam, and the wavelength conversion device comprises an optical zone and a wavelength conversion zone, wherein the wavelength conversion device is adapted to rotate around a central axis, such that the optical zone and the wavelength conversion zone alternately enter the transmission path of the excitation beam, the wavelength conversion zone is adapted to convert the excitation beam into a first conversion beam, and a wavelength of the excitation beam is different from a wavelength of the first conversion beam; and the light filtering device is disposed on the transmission paths of the excitation beam and the first conversion beam;

at least one light valve, disposed on a transmission path of the illumination beam and adapted to convert the illumination beam into at least one image beam; and a lens module, disposed on a transmission path of the at least one image beam and adapted to receive the at least one image beam and produce the projection beam, wherein in a first time period, the optical zone enters the transmission path of the excitation beam, the first sub-beam of the excitation beam is transmitted to the optical zone via the first zone of the first light splitting element, and the second sub-beam is transmitted to the light filtering device via the first light splitting element and the first light reflecting element, and in a second time period, the excitation beam is transmitted to the wavelength conversion zone to be converted into the first conversion beam.

14. The projection device according to claim 13, wherein the first zone of the first light splitting element is adapted to allow the excitation beam to pass therethrough and reflect the first conversion beam, and the second zone of the first light splitting element is adapted to reflect the excitation beam and the first conversion beam.

15. The projection device according to claim 13, wherein the first zone of the first light splitting element is adapted to reflect the first sub-beam and allow the first conversion beam to pass therethrough, and the second zone is adapted to allow the excitation beam and the first conversion beam to pass therethrough.

16. The projection device according to claim 13, wherein the illumination system further comprises a diffusion element disposed between the excitation light source and the first light splitting element and adapted to allow the excitation beam to pass therethrough.

17. The projection device according to claim 13, wherein the first sub-beam of the excitation beam is transmitted to the optical zone of the wavelength conversion device and is reflected by the optical zone to the second zone of the first light splitting element.

18. The projection device according to claim 13, wherein the optical zone of the wavelength conversion device comprises a wavelength conversion material, the first sub-beam of the excitation beam is transmitted to the optical zone of the wavelength conversion device, at least a portion of the first sub-beam is converted into a second conversion beam, and the wavelength of the first conversion beam is different from a wavelength of the second conversion beam.

19. The projection device according to claim 13, wherein the illumination system further comprises a second light reflecting element disposed on the second zone of the first light splitting element, wherein the second light reflecting element is located between the first light splitting element and the first light reflecting element.

20. The projection device according to claim 13, wherein the illumination system further comprises a supplementary light source adapted to provide a supplementary beam, wherein the supplementary beam sequentially passes through the first light reflecting element and the first light splitting element to be transmitted to the light filtering device, and a wavelength of the supplementary beam is different from the wavelength of the excitation beam.

21. The projection device according to claim 13, wherein the illumination system further comprises a supplementary light source and a second light splitting element, wherein the supplementary light source is adapted to provide a supplementary beam, and the second light splitting element is disposed on the transmission paths of the supplementary beam and the first conversion beam, wherein the excitation beam and the first conversion beam pass through the second light splitting element, the supplementary beam is reflected by the second light splitting element to the light filtering device, and a wavelength of the supplementary beam is different from the wavelength of the excitation beam.

22. The projection device according to claim 13, wherein the light filtering device of the illumination system comprises a first light filtering zone and a second light filtering zone, and the light filtering device is adapted to rotate around a central axis, such that the first light filtering zone and the second light filtering zone of the light filtering device alternately enter the transmission path of the second sub-beam.

23. The projection device according to claim 22, wherein in the first time period, at least a portion of the first sub-beam from the optical zone and the second sub-beam from the first light reflecting element are transmitted to the first light filtering zone, and in the second time period, the first conversion beam from the wavelength conversion zone is transmitted to the second light filtering zone.

24. The projection device according to claim 23, wherein in the second time period, the first sub-beam is transmitted to the wavelength conversion zone via the first zone of the first light splitting element and is converted into a portion of the first conversion beam, the portion of the first conversion beam is reflected by the wavelength conversion zone and is transmitted to the second light filtering zone via the first light splitting element, the second sub-beam is transmitted to the second light filtering zone of the light filtering device via the first light reflecting element, the second sub-beam is reflected by the second light filtering zone and then is transmitted to the wavelength conversion zone and converted into another portion of the first conversion beam, and the another portion of the first conversion beam is reflected by the wavelength conversion zone and is transmitted to the second light filtering zone via the first light splitting element.

* * * * *